(12) United States Patent
Suzuoki

(10) Patent No.: US 7,689,784 B2
(45) Date of Patent: Mar. 30, 2010

(54) METHODS AND APPARATUS FOR DYNAMIC LINKING PROGRAM OVERLAY

(75) Inventor: Masakazu Suzuoki, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 1230 days.

(21) Appl. No.: 11/083,863

(22) Filed: Mar. 18, 2005

(65) Prior Publication Data

US 2006/0212643 A1 Sep. 21, 2006

(51) Int. Cl.
*G06F 9/40* (2006.01)
(52) U.S. Cl. .................. 711/154; 711/202; 717/167
(58) Field of Classification Search .......... 711/154, 711/202; 717/167
See application file for complete search history.

(56) References Cited

U.S. PATENT DOCUMENTS

| | | | |
|---|---|---|---|
| 6,526,491 B2 | 2/2003 | Suzuoki et al. | |
| 6,748,503 B1 * | 6/2004 | Morrison | 711/159 |
| 2001/0047512 A1 | 11/2001 | Szewerenko et al. | |

OTHER PUBLICATIONS

Hennessy, John L and Patterson, David A, Computer Organization and Design, 1998, Morgan Kaufmann Pulishers, Inc., second edition, pp. 148, A-22-A-26.*

Sweeney, Latanya, Call by value and call by reference, Fall 2002, retreived from internet on Mar. 27, 2009, [url=http://privacy.cs.cmu.edu/courses/java/lectures/lecture16/sld064.htm], pp. 1-3.*
International Search Report and Written Opinion based on PCT/JP2006/305754, dated Aug. 3, 2006, 10 pgs.
Levine J.; "Linkers and Loaders—Loading and Overlays," Internet Citation, Jun. 15, 1999, XP002368385, pp. 8-201-8-225.

* cited by examiner

*Primary Examiner*—Christian P Chace
*Assistant Examiner*—Jared I Rutz
(74) *Attorney, Agent, or Firm*—Matthew B. Dernier, Esq.; Gibson & Dernier LLP

(57) ABSTRACT

Methods and apparatus provide for loading at least one software program module from a storage medium into a local memory of a processor for execution, the storage medium containing a main module and a plurality of sub-modules of the software program; and updating an address table, copies of the address table being located in at least one of the storage medium and the local memory, and the address table having at least one entry for each of the modules, each entry including at least one of: (i) a destination address representing an address within the local memory of a processor at which the corresponding module is disposed, and (ii) a source address representing an address within the storage medium at which the corresponding module originates.

27 Claims, 10 Drawing Sheets

FIG. 3

| RELATIVE ADDRESS | CONTENT |
|---|---|
| 0 | ENTRY 0 \| BUDGET 0 \| ENTRY 1 \| BUDGET 1<br>ENTRY 2 \| BUDGET 2 \| ENTRY 3 \| BUDGET 3<br>. . . |
| FRAME 1 | STATIC DATA — 160 |
| ENTRY 1 | TEXT (PROGRAM) — 162A |
| ENTRY 2 | TEXT (PROGRAM) — 162B<br>. . . |
| ENTRY N | TEXT (PROGRAM) — 162N |
| SIZE 1 | OTHER DATA — 164 |

METHODS AND APPARATUS FOR DYNAMIC LINKING PROGRAM OVERLAY

BACKGROUND

The present invention relates to methods and apparatus for transferring data within a multi-processing system.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In some processing systems a processor may employ a relatively small local memory in which to execute program code (as opposed to a larger random access memory, RAM). The larger RAM (main or system memory) may be used for bulk storage. The processor may also employ direct memory access (DMA) technology to transfer data from the main memory to the local memory. Data streaming may be employed to feed data (such as video data) from the main memory into the local memory for data manipulation. Application programs, however, cannot be fed into the local memory using data streaming techniques.

SUMMARY OF THE INVENTION

In accordance with one or more embodiments of the present invention, two overlay techniques may be used to execute modules of an application program in a relatively small local memory of the processing system. One technique involves synchronous module invocation in which a single processor sequentially receives program modules for execution into the local memory using call by reference and/or call by value subroutine argument transfers. The other technique involves asynchronous module invocation in which a multiple processors receive program modules for execution into respective local memories using only call by value subroutine argument transfers.

The main memory image may include an address table, and respective program module sections. The address table may include a destination address, a source address, a size (of the module), and a frame address for each program module. The destination address is preferably the address in the local memory in which the program module is located and is changed dynamically by the processor software. The source address is preferably a static value representing the location (start or end) in the main memory at which the program module is located. The frame address is preferably the start address within a module at which the static data of the module is located.

Each program module may be formed using position independent code. A header of the module may include an entry ID that references the start position of each sub-program of the module and a budget program that can calculate the execution time of the sub-program.

The local memory image preferably includes a copy of the table from the main memory followed by a main (or mother) program module. Subsequent program module(s) (sub-modules) may follow the mother module and a stack area may be located at the bottom of the memory space.

In a module invocation, the mother module may call a sub-module into the local memory by one or more of: (i) looking up the main memory location of the sub-module via the table; (ii) copying the sub-module to the heap pointer (the start location of the free space in the local memory); (iii) updating the destination address of the tables in the local memory and/or the main memory (i.e., the heap pointer); and (iv) augmenting the heap pointer by the size of the program module. The mother module may then call a function in the sub-module by one or more of: (i) pushing the current frame address; (ii) setting a new frame pointer (the destination address+frame address); (iii) loading an entry address by loading the destination address+entry ID; and (iv) jumping to the entry address.

In accordance with one or more embodiments of the present invention, methods and apparatus provide for: loading at least one software program module from a storage medium into a local memory of a processor, the storage medium containing a main module and a plurality of sub-modules of the software program; and updating an address table. Copies of the address table are located in at least one of the storage medium and the local memory, and the address table preferably has at least one entry for each of the modules, each entry including at least one of: (i) a destination address representing an address within the local memory of a processor at which the corresponding module is disposed, and (ii) a source address representing an address within the storage medium at which the corresponding module originates.

The destination address of the address table is preferably updated to represent an address within the local memory to which the corresponding module is copied.

Preferably loading the at least one software program module into the local memory includes obtaining the source address of the module from the address table. The loading feature may further include copying the module into the local memory starting at an address dictated by a heap pointer, which represents a position within the local memory at which free space begins.

Updating the destination address of the module may include changing the destination address of the address table to include the heap pointer.

Each entry of the address table preferably further includes at least one of: (i) a size of the corresponding module; and (ii) a frame address representing an address at which static data of the corresponding module is located. The methods and apparatus may further provide for augmenting the heap pointer by an amount corresponding to the size of the module loaded into the local memory.

The at least one module may be a main module stored in a local memory of a first processor. The methods and apparatus may further provide for the main module causing a sub-module to be loaded from the storage medium into a local memory of a second processor; and updating the address table in each of the local memories by changing the destination address of the sub-module to represent an address within the local memory of the second processor at which the sub-module is disposed.

Loading the sub-module into the local memory of the second processor preferably includes obtaining the source address of the sub-module from the address table. The loading feature preferably further includes copying the sub-module into the local memory of the second processor starting at an address dictated by a heap pointer of the second processor, which represents a position within the local memory at which free space begins. Updating the destination address of the sub-module may include changing the destination address of the address table to include the heap pointer.

The methods and apparatus may further provide for: calling a second software program module from a first software program module within the local memory of the processor. The call may be by reference or by value. Each of the software program modules is preferably formed of one or more sections of executable program code and includes a header having one or more entries, each entry having an entry address representing an address within the module at which a corresponding one of the sections of executable program code is located.

The calling feature may include loading a frame pointer of the processor with the destination address augmented with the frame address of the second module. The methods and apparatus may further provide for: pushing a previous value of the frame pointer onto a stack of the local memory before loading the frame pointer with the destination address augmented with the frame address of the second module. The calling feature may further include loading an instruction pointer of the processor with an address corresponding with a particular section of program code of the second module. The calling feature may also include loading the instruction pointer with the destination address augmented with the entry address of the particular section of program code of the second module.

Thereafter, the methods and apparatus may provide for: jumping to the address of the instruction pointer, executing the program code and returning to the first module from the second module. The return may be facilitated by popping the previous value of the frame pointer off of the stack and executing a next instruction.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 3 is a block diagram illustrating the structure of a software program module of the memory image of FIG. 2 in accordance with one or more aspects of the present invention;

DETAILED DESCRIPTION OF THE PRESENT INVENTION

Figure 1:
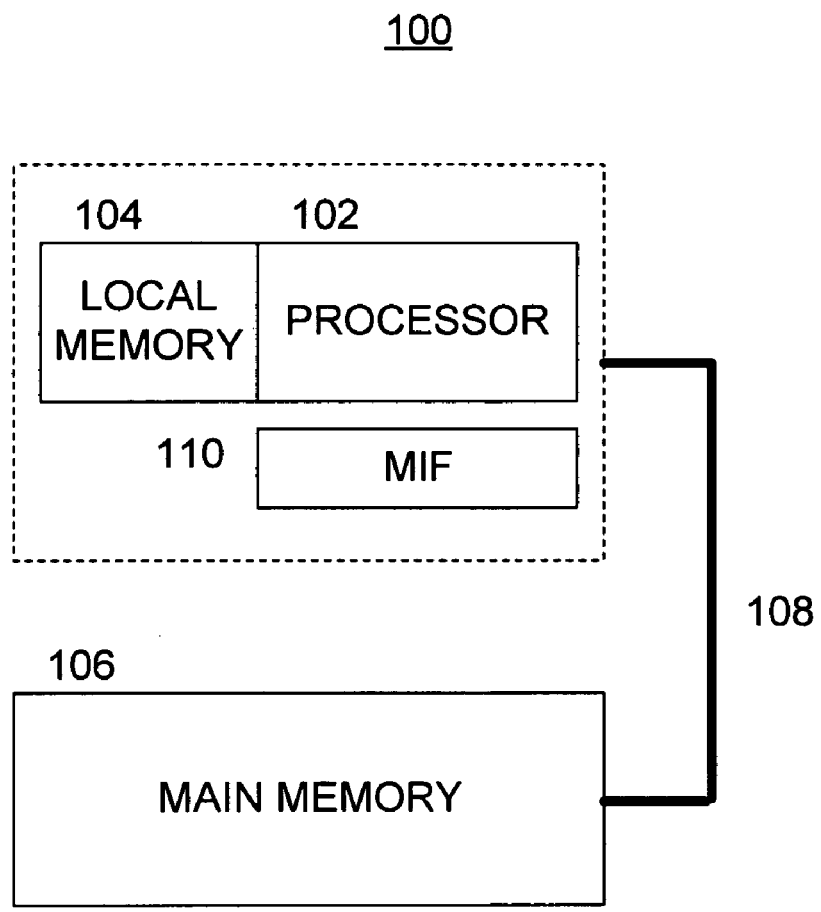
FIG. 1 is a block diagram illustrating the structure of a processing system that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The apparatus 100 preferably includes a processor 102, a local memory 104, a main memory 106 (e.g., a DRAM), and a bus 108. The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

The local memory 104 is located in proximity to the processor 102 such that the processor may execute program code and otherwise manipulate data within the local memory 104 as opposed to the system memory 106. The local memory 104 is preferably not a traditional hardware cache memory in that there are preferably no on chip or off chip hardware cache circuits, cache registers, cache memory controllers, etc. to implement a hardware cache memory function. As on-chip space may be limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access is preferably implemented utilizing a direct memory access controller DMAC within the memory interface 110.

In accordance with one or more embodiments of the present invention, the processor 102 may execute software programs by copying executable code from the main memory 106 into the local memory 104 (via the MIF 110) and run the software programs within the local memory 104. As the local memory 104 may be relatively small (such as 256 KB), it may be desirable to permit portions of the software program (as opposed to the entire program) and any associated data to be copied into the local memory 104 and executed. This requires some mechanism by which to control and manage the movement of portions of the software program into the local memory, execution of the portions of the program, function calls, etc.

Figure 2:
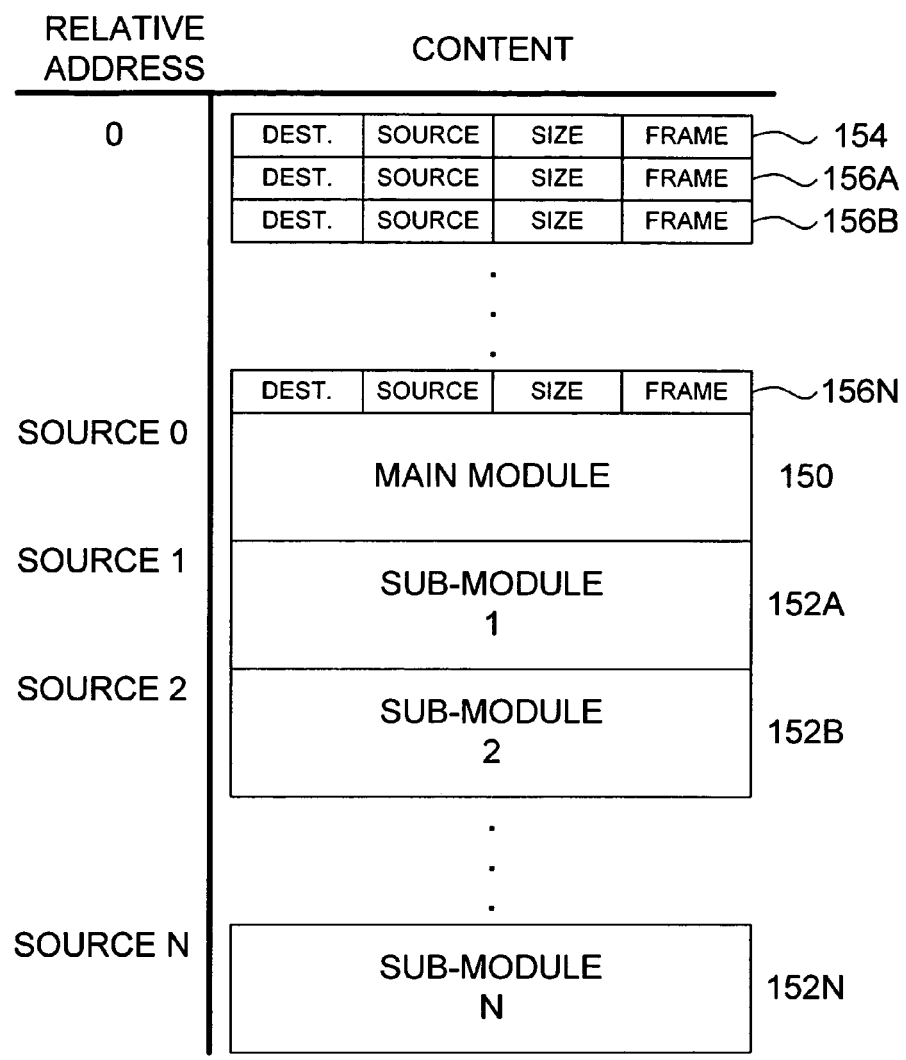
FIG. 2 is a block diagram illustrating a memory image of the main memory of FIG. 1 and/or other embodiments herein.

With reference to FIG. 2, a block diagram is shown that illustrates the memory image of a software program within the main memory 106. The structure of the memory image is presented by way of a relative address along the left-hand column and associated content in the body of the figure. The memory image preferably includes a main module 150 and a plurality of sub-modules 152A, 152B, . . . 152N. The position of the main module within the main memory 106 is defined by the address SOURCE 0, where such address preferably identifies the start address of the executable code of the main module 150. It is noted that other addressing conventions may be employed, such as defining the position of the main module 150 by way of the ending address within the main memory 106 or a combination of the start and ending addresses. The sub-modules 152 preferably follow the main module 150 within the main memory 106 and the positions thereof are preferably defined by way of respective start addresses SOURCE 1, SOURCE 2, . . . SOURCE N.

The memory image also preferably includes an address table beginning at relative address 0, where the address table includes at least one entry for each of the modules 150, 152. A first entry 154 is preferably associated with the main module 150, while subsequent entries 156A, 156B, . . . 156N are preferably associated with the sub-modules 152A, 152B, . . . 152N, respectively. Each entry 154, 156 of the address table preferably includes at least one of: (i) a destination address (DEST.) representing an address within the local memory 104 of the processor 102 at which the corresponding module is disposed, (ii) a source address (SOURCE) representing an address within the main memory 106 at which the corresponding module originates, (iii) a size (SIZE) of the corresponding module, and (iv) a frame address (FRAME) representing an address within the corresponding module at which static data thereof is located.

Reference is now made to FIG. 3, which illustrates the structure of the modules 150, 152 of FIG. 2. Each module preferably includes an area in which data may be located, such as static data 160, and one or more sections of executable program code 162A, 162B, . . . 162N. The module may also include an area for other data 164, such as may be used for debugging or other activities. The structure of the modules also preferably includes a header having one or more entries, each entry including an entry address (ENTRY #) representing an address within the module at which a corresponding one of the sections of executable program code 162 is located. Thus, for example, the section of executable program code 162A may have a start-address at ENTRY 1, which is included in the header. Other entries (ENTRY 0, ENTRY 2, etc.) are also located in the header for the remaining sections of executable program code 162.

It is noted that the header may also include budget information (BUDGET #), which may be utilized to estimate the execution time of a particular module 152 of the program. In a preferred embodiment, the budget information includes a small program that calculates an estimated execution time as a function of the size of the module and the size of the data associated therewith. The size of the module 152 may be obtained from the address table (FIG. 2), which is also reflected by the relative address SIZE 1, representing the end of the last section of executable program code 162N of the module image illustrated in FIG. 3. It is also noted that the frame address of the address table (FIG. 2), which represents an address within the module at which static data is located, may be seen in FIG. 3 as the start address of the static data 160.

Figure 4:
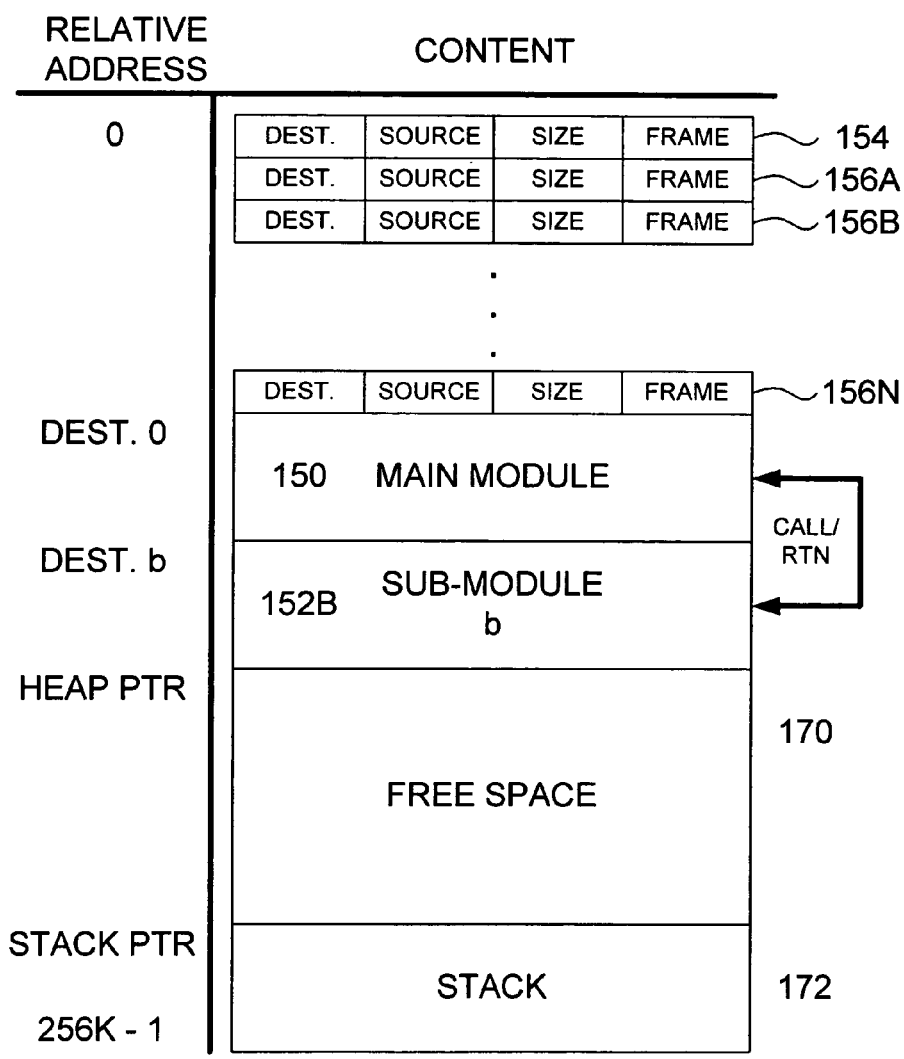
FIG. 4 is a block diagram illustrating a memory image of the local memory of FIG. 1 and/or other embodiments herein.

Reference is now made to FIG. 4, which is a block diagram illustrating the memory image within the local memory 104. It is understood that the block diagram of FIG. 4 assumes that one or more of the modules from the main memory 106 (FIG. 2) have been loaded into the local memory 104. In this example, the processor 102 has loaded the main module 150 and sub-module 152B into the local memory 104 as well as the address table. The processor 102 is preferable operable to initiate the loading of the modules, such as the main module 150 into the local memory 104 by obtaining the source address SOURCE 0 of the main module 150 from the entry 154 of the address table (FIG. 2). The processor 102 may also obtain the size (SIZE) of the main module 150 from the entry 154 in order to facilitate loading the main module 150 into the local memory 104 without inadvertently taking too much or too little code from the main memory 106. It is noted that the address table may utilize an end address of the modules within the entries of the address table as opposed to the size of the modules without departing from the spirit and scope of the invention.

Preferably, the software program of FIGS. 2-3 is designed utilizing position independent code such that when any module, such as the main module 150 is loaded into the local memory 104, the relative address (FIG. 2) of the main module 150 is related to the physical address within the local memory 104 by way of a base address within the local memory 104 augmented by the frame address associated with that module. The start address of the main module 150 within the local memory 104 is defined as the destination address DEST. 0. The processor 102 is preferably operable to update the address table to reflect the change in the destination address of the main module 150 when it has been loaded into the local memory 104. Thus, the entry associated with the main module 150 within the address table of the memory image of the local memory 104 is updated to reflect the address at which the main module 150 is disposed. Preferably, the processor 102 is operable to cause the address table within the main memory 106 (FIG. 2) to be updated in a similar way.

Once the main module 150 is loaded into the local memory 104, the processor 102 may execute the program code associated with the main module 150 to run the software program. In this regard, the main module 150 may require that one or more of the sub-modules 152 be loaded into the local memory 104 at opportune times in order to successfully execute the software program. In the example illustrated in FIG. 4, the sub-module 152B has already been loaded into the local memory 104. It is noted that when a module is loaded into the local memory 104, the heap pointer (HEAP PTR) is utilized as the starting address at which the module is stored. Indeed, the heap pointer represents the starting address of the free space 170 within the local memory 104. The stack 172 is disposed at the bottom of the local memory 104, starting at an address defined by the stack pointer (STACK PTR). The address of the heap pointer, therefore, becomes the destination address (DEST.) of the module when it has been loaded into the local memory 104. Thus, the processor 102 is preferably operable to update the destination address (DEST.) of the address table by storing the address of the heap pointer in the entry associated with that module. The heap pointer is preferably augmented by an amount corresponding to the size (SIZE) of the module, which may be obtained from the address table. The updated value of the HEAP PTR will thus represent a new starting address of the free space 170.

The processor 102 is preferably operable to permit one module to call another module within the local memory 104. By way of example, the main module 150 may call the sub-module 152B by loading a frame pointer of the processor 102 with the destination address (DEST. b) of the sub-module 152B augmented with the frame address of that module. Thus, the frame pointer will point to an address within the local memory 104 at which the static data 160 (FIG. 3) of the sub-module 152B begins. The previous value of the frame pointer is preferably pushed onto the stack 172 before the frame pointer is loaded with the destination address augmented with the frame address of the sub-module 152B. The instruction pointer of the processor 102 may be loaded with an address corresponding with a particular section of executable program code 162 of the sub-module 152B such that the code may be executed by the processor 102. This may be achieved by loading the instruction pointer with the destination address (DEST. b) augmented with the entry address (FIG. 3) of the particular section of executable program code 162. The processor 102 may then jump to the address of the instruction pointer and execute the code associated therewith. When the one or more sections of executable program code 162 of the sub-module 152B have been executed, program execution may return to the main module 150 by popping the previous value of the frame pointer off of the stack 172 and executing a next instruction of the main module 150.

Figure 5:
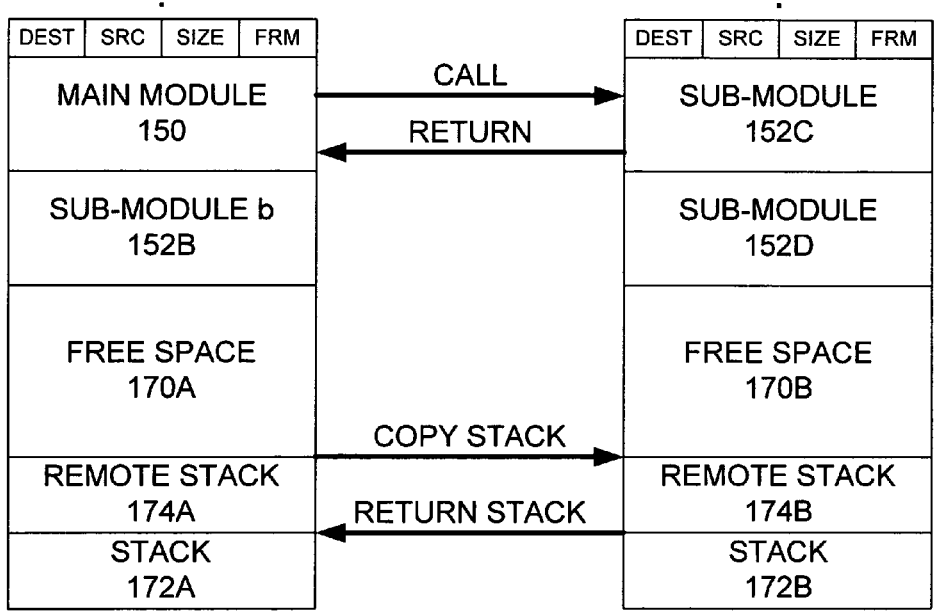
FIG. 5 is a block diagram illustrating an example of how one module may call another module in respective local memories of a multi-processor system.
Figure 6:
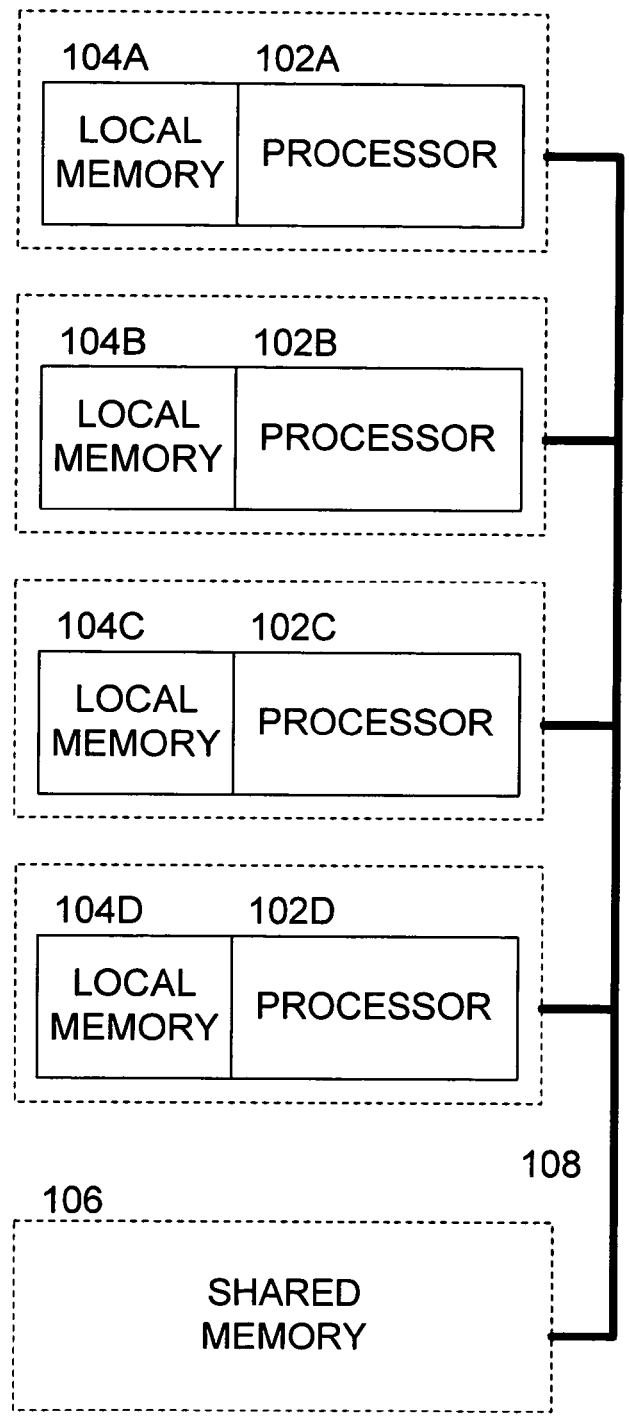
FIG. 6 is a diagram illustrating the structure of a multi-processing system having two or more sub-processors that may be adapted in accordance with one or more aspects of the present invention.
Figure 10:
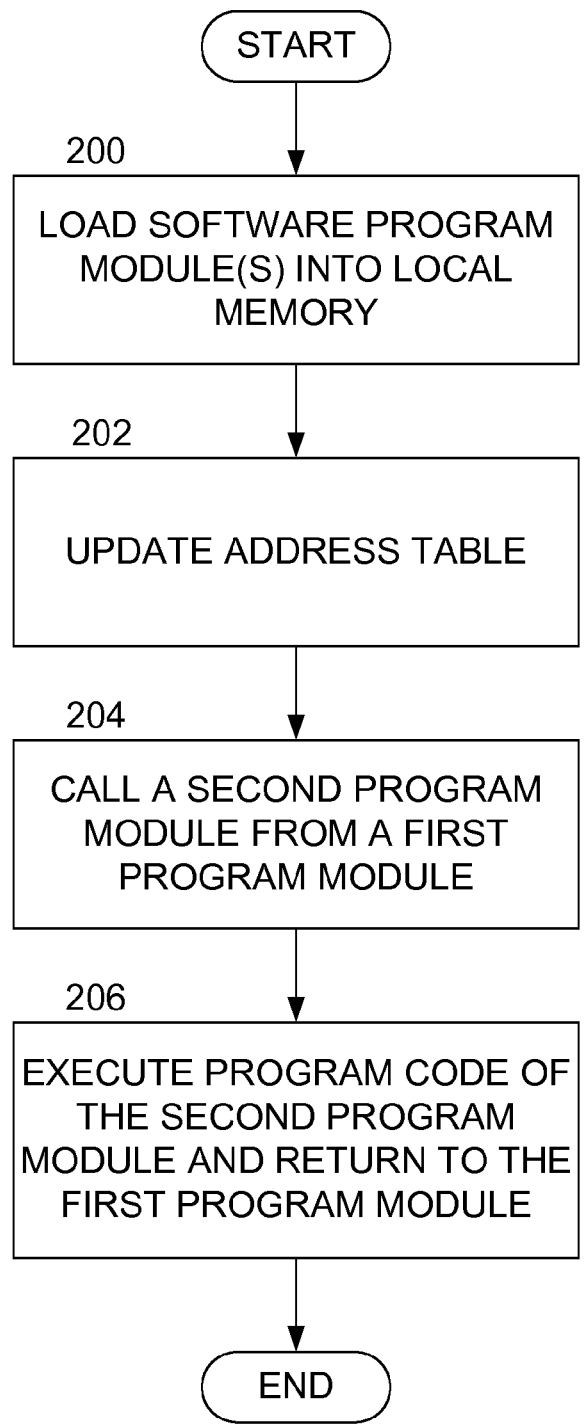
FIG. 10 is a flow diagram illustrating an example of how one module may call another module in respective local memories of a multi-processor system.

In accordance with one or more further embodiments of the present invention, any module, such as sub-module 152C may be loaded into and executed in the local memory 104 of another processor 102. In this regard, reference is made to FIGS. 5-6, and 10. FIG. 5 illustrates the memory image of a first local memory 104A of a first processor 102A and a second local memory 104B of a second processor 102B. FIG. 6 is a block diagram of a multi-processing system 100A that may be adapted to implement the features discussed herein and one or more further embodiments of the present invention. FIG. 10 is a flow diagram illustrating an example of how one module may call another module in respective local memories of a multi-processor system. The system 100A includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

The sub-module 152C may be loaded into the local memory 104B such that the processor 102B may execute the program code associated with the sub-module 152C to run the software program (action 200). The processor 102B is preferably operable to initiate the loading of the sub-module 152C into the local memory 104B by obtaining the source address SOURCE 3 of the sub-module 152C from the entry 156C of the address table (FIG. 2). The processor 102B may also obtain the size (SIZE) of the sub-module 152C from the entry 156C in order to facilitate loading. As discussed above, the software program of FIGS. 2-3 is designed utilizing position independent code such that when the sub-module 152C is loaded into the local memory 104B, the relative address (FIG. 2) of the sub-module 152C is related to the physical address within the local memory 104 by way of a base address within the local memory 104B augmented by the frame address associated with that module. The start address of the sub-module 152C within the local memory 104B is defined as the destination address DEST. c. The processor 102B is preferably operable to update the address table to reflect the change in the destination address of the sub-module 152C when it has been loaded into the local memory 104B (action 202). Thus, the entry associated with the sub-module 152C within the address table of the memory image of the local memory 104B is updated to reflect the address at which the sub-module 152C is disposed. Preferably, the processor 102B is also operable to cause the address table within the main memory 106 (FIG. 2) to be updated in a similar way.

When the sub-module 152C is loaded into the local memory 104, the heap pointer (HEAP PTR) is utilized as the starting address at which the module is stored. The address of the heap pointer becomes the destination address (DEST. c) of the sub-module 152C when it has been loaded into the local memory 104B. Thus, the processor 102B is preferably operable to update the destination address (DEST. c) of the address table by storing the address of the heap pointer in the entry associated with the sub-module 152C. The heap pointer is preferably augmented by an amount corresponding to the size (SIZE) of the module, which may be obtained from the address table. The updated value of the HEAP PTR will thus represent a new starting address of the free space 170B.

The processor 102A is preferably operable to permit one module to call another module within the local memory 104B of the processor 102B (action 204). By way of example, the main module 150 may call the sub-module 152C by pushing any register values, parameter data (e.g., data needed by the sub-module 152C during execution), etc. onto a remote stack 174A and then copying the remote stack 174A into the local memory 104B or the second processor 102B. The value of the frame pointer of the second processor 102B is preferably pushed onto the stack 172B and the frame pointer is loaded with the destination address (DEST. c) augmented with the frame address of the sub-module 152C. Thus, the frame pointer will point to an address within the local memory 104B at which the static data 160 (FIG. 3) of the sub-module 152C begins. The instruction pointer of the processor 102B may be loaded with an address corresponding with a particular section of executable program code 162 of the sub-module 152C such that the code may be executed by the processor 102B. This may be achieved by loading the instruction pointer with the destination address (DEST. c) augmented with the entry address (FIG. 3) of the particular section of executable program code 162. The processor 102C may then jump to the address of the instruction pointer and execute the code associated therewith.

When the one or more sections of executable program code 162 of the sub-module 152C have been executed, program execution may return to the main module 150 within the local memory 104A (action 206). The register values, parameters, etc. resulting from the execution of the sub-module 152C may be pushed onto the remote stack 174B and the remote stack 174B may then be copied into the local memory 104A of the first processor. The first processor 102A may pop the previous value of the frame pointer off of the stack 172A and execute a next instruction of the main module 150.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 7:
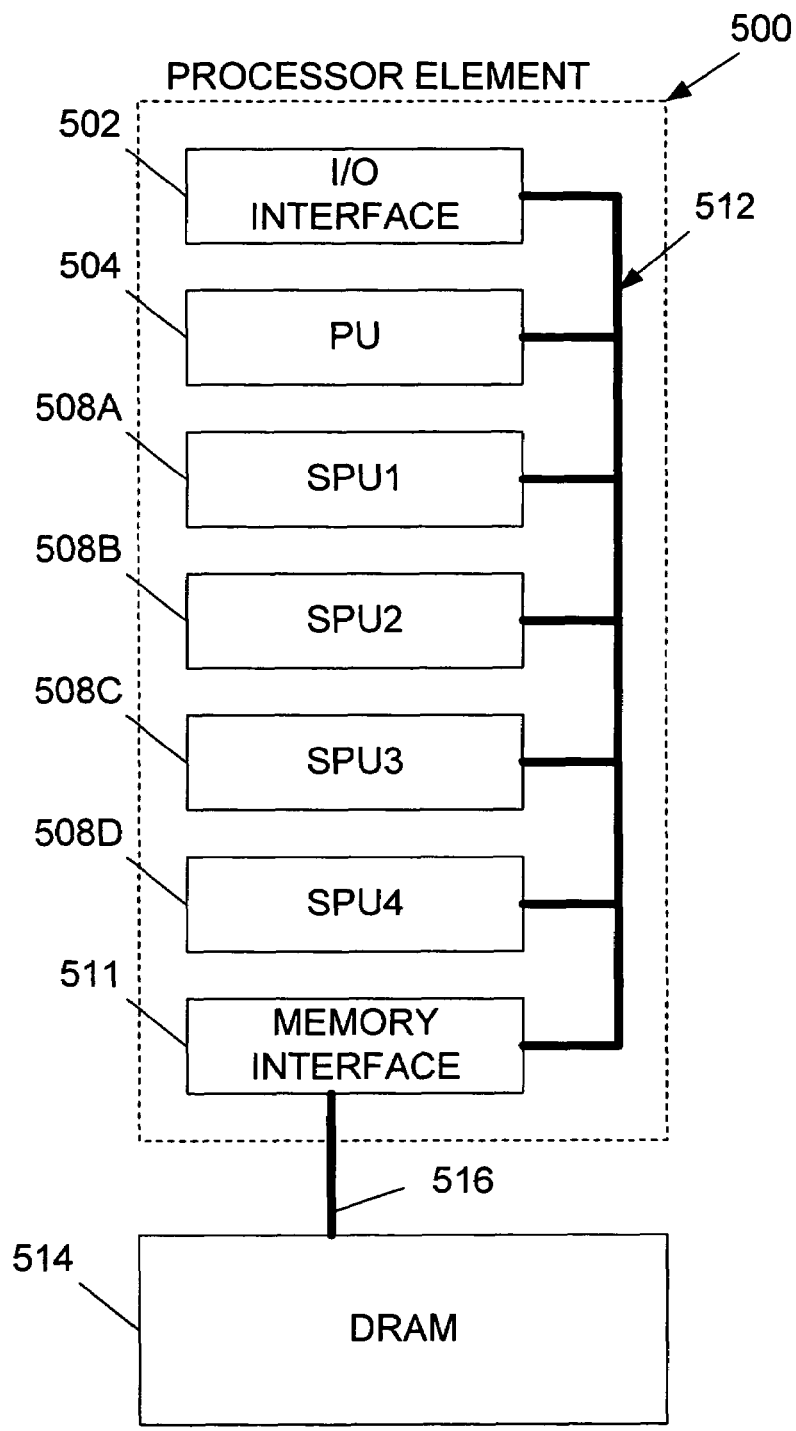
FIG. 7 is a diagram illustrating a preferred processor element (PE) that may be used to implement one or more further aspects of the present invention.

With reference to FIG. 7, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 8:
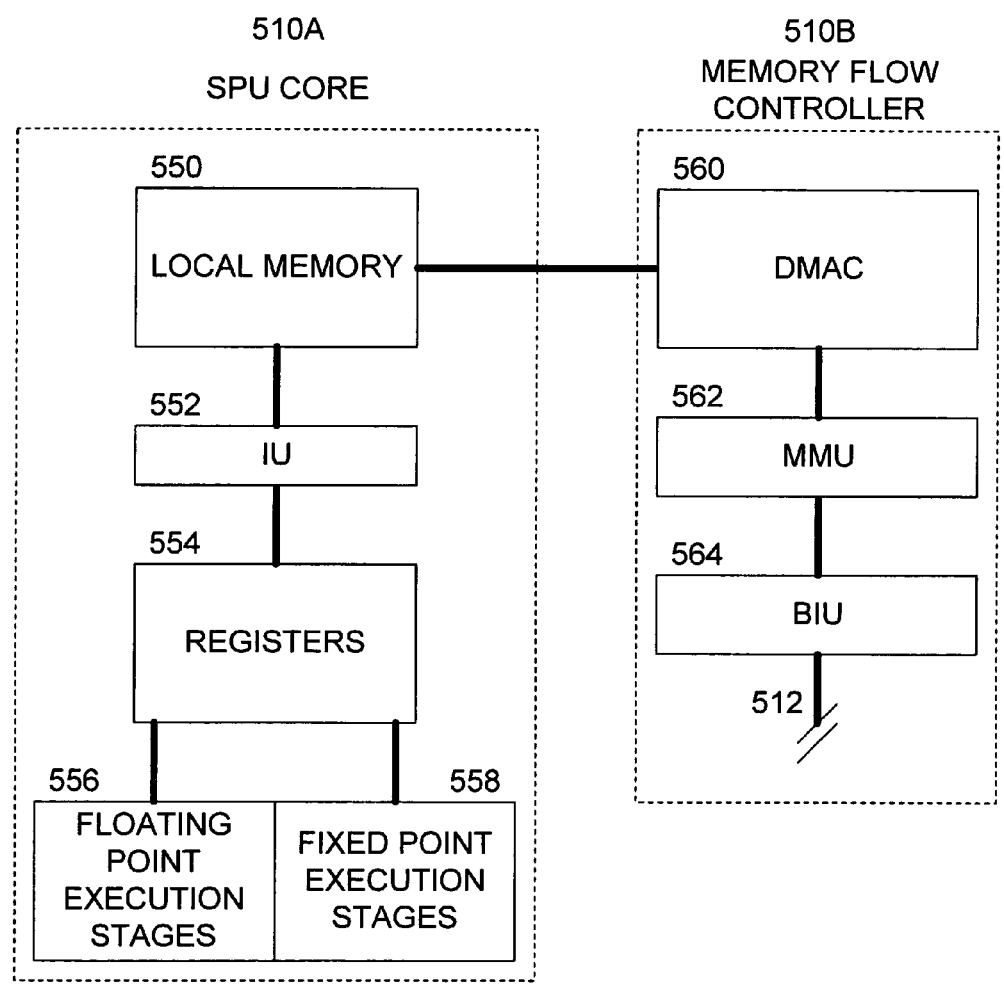
FIG. 8 is a diagram illustrating the structure of an exemplary sub-processing unit (SPU) of the system of FIG. 6 that may be adapted in accordance with one or more further aspects of the present invention.

FIG. 8 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 9:
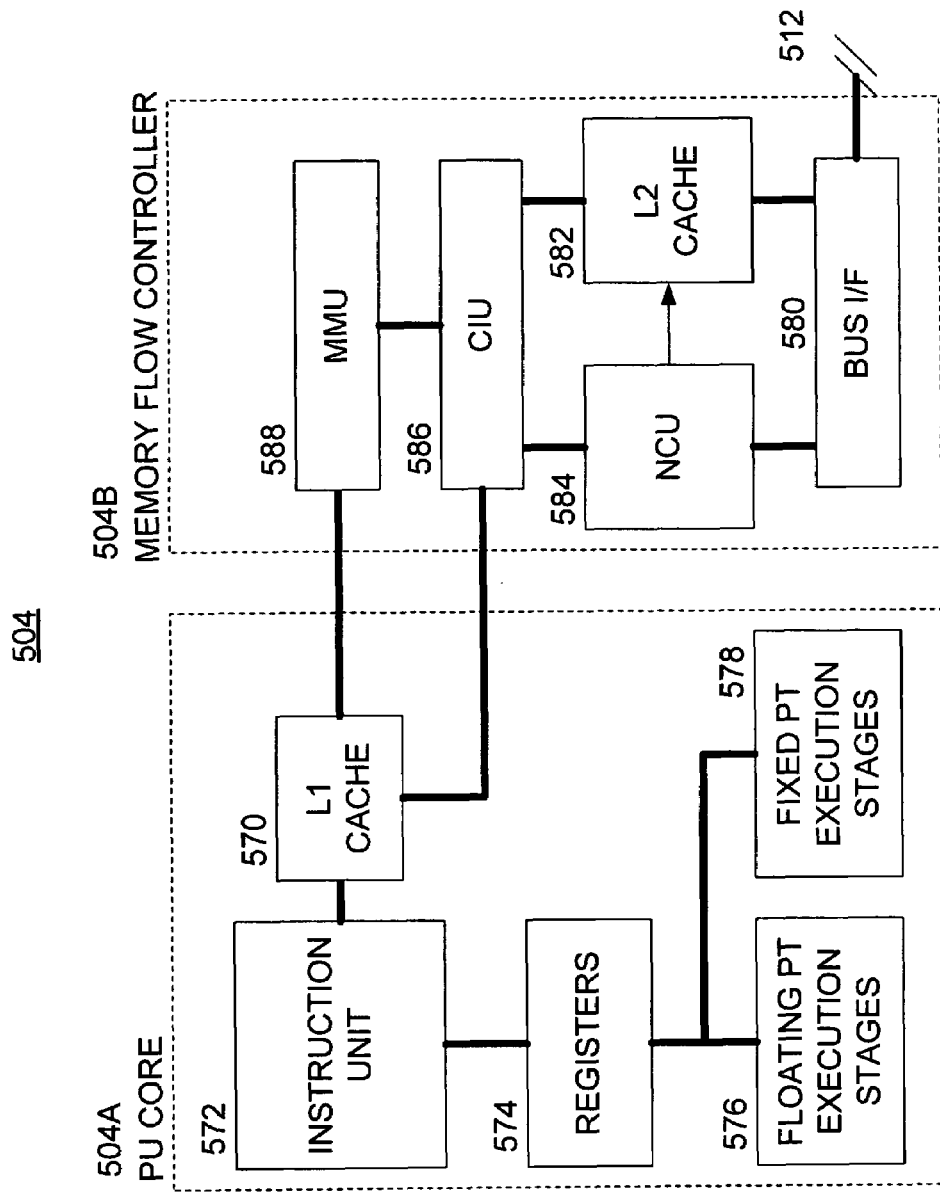
FIG. 9 is a diagram illustrating the structure of an exemplary processing unit (PU) of the system of FIG. 6 that may be adapted in accordance with one or more further aspects of the present invention.

FIG. 9 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128KB.

The L2 cache memory 582 (and supporting hardware logic) is preferably designed to cache 512KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:

loading at least one software program module from a storage medium into a local memory of a processor, the storage medium containing a main module and a plurality of sub-modules of the software program;

updating an address table, copies of the address table being located in at least one of the storage medium and the local memory, and the address table having at least one entry for each of the modules, each entry including at least one of: (i) a destination address representing an address within the local memory of a processor at which the corresponding module is disposed, and (ii) a source address representing an address within the storage medium at which the corresponding module originates, wherein the destination address of the address table is updated to represent an address within the local memory to which the corresponding module is copied;

calling a second software program module from a first software program module, at least the first software program module being within the local memory of the processor; and calling by value the second software program module within a local memory of a further processor from the first software program module, wherein the local memory of the further processor includes an address table having at least one entry for each of the modules, each entry including at least one of: (i) a destination address representing an address within the corresponding local memory at which the corresponding module is disposed, and (ii) a source address representing an address within the storage medium at which the corresponding module originates.

2. The method of claim 1, wherein the address table within the local memory of the processor starts at a relative address of zero.

3. The method of claim 1, wherein the step of loading the at least one software program module into the local memory of the processor includes obtaining the source address of the at least one software program module from the address table located in at least one of the storage medium and the local memory of the processor.

4. The method of claim 3, wherein the step of loading further includes copying the at least one software program module into the local memory of the processor starting at an address dictated by a heap pointer, which represents a position within the local memory of the processor at which free space begins.

5. The method of claim 4, wherein the step of updating the destination address of the at least one software program module includes changing the destination address of the address table located in at least one of the storage medium and the local memory of the processor to include the heap pointer.

6. The method of claim 4, wherein each entry of the address table located in at least one of the storage medium and the local memory of the processor further includes at least one of: (i) a size of the corresponding module; and (ii) a frame address representing an address at which static data of the corresponding module is located.

7. The method of claim 6, further comprising augmenting the heap pointer by an amount corresponding to the size of the at least one software program module loaded into the local memory of the processor.

8. The method of claim 1, wherein the at least one software program module is a main module stored in a local memory of the processor.

9. The method of claim 8, further comprising:
the main module causing a sub-module to be loaded from the storage medium into a local memory of the further processor; and
updating the address table in each of the local memories by changing the destination address of the sub-module to represent an address within the local memory of the further processor at which the sub-module is disposed.

10. The method of claim 9, wherein:
the step of loading the sub-module into the local memory of the further processor includes obtaining the source address of the sub-module from the address table located within at least one of the one or more of the local memories and the storage medium;
the step of loading further includes copying the sub-module into the local memory of the further processor starting at an address dictated by a heap pointer of the further processor, which represents a position within the local memory at which free space begins.

11. The method of claim 10, wherein the step of updating the destination address of the sub-module includes changing the destination address of the address table located within at least one of the one or more of the local memories and the storage medium to include the heap pointer.

12. The method of claim 10, wherein each entry of the address table located within at least one of the one or more of the local memories and the storage medium further includes at least one of: (i) a size of the corresponding module; and (ii) a frame address representing an address at which static data of the corresponding module is located.

13. The method of claim 12, further comprising augmenting the heap pointer by an amount corresponding to the size of the sub-module loaded into the local memory.

14. The method of claim 1, wherein the call is by reference or by value.

15. The method of claim 1, further comprising pushing data on to a stack of the local memory of the processor and transferring at least some of the data to a stack of the local memory of the further processor.

16. The method of claim 1, wherein each of the software program modules is formed of one or more sections of executable program code and includes a header having one or more entries, each entry having an entry address representing an address within the module at which a corresponding one of the sections of executable program code is located.

17. The method of claim 16, wherein the step of calling includes loading a frame pointer of the processor with the destination address augmented with the frame address of the second module.

18. The method of claim 17, further comprising pushing a previous value of the frame pointer onto a stack of the local memory of the processor before loading the frame pointer with the destination address augmented with the frame address of the second module.

19. The method of claim 18, wherein the step of calling includes loading an instruction pointer of the processor with an address corresponding with a particular section of program code of the second module.

20. An apparatus, comprising:
at least one processor capable of operative communication with a main memory; and
a local memory coupled to the at least one processor, wherein the at least one processor is operable to:
load at least one software program module from the main memory into the local memory, the main memory containing a main module and a plurality of sub-modules of the software program; and
update an address table, copies of the address table being located in at least one of the main memory and the local memory, and the address table having at least one entry for each of the modules, each entry including at least one of: (i) a destination address representing an address within the local memory of a processor at which the corresponding module is disposed, and (ii) a source address representing an address within the storage medium at which the corresponding module originates,
wherein: the at least one module is a main module stored in a local memory of a first processor, which is operable to: (i) execute the main module to cause a sub-module to be loaded from the main memory into a local memory of a second processor; and (ii) update the address table in each of the local memories by changing the destination address of the sub-module to represent an address within the local memory of the second processor at which the sub-module is disposed.

21. The apparatus of claim 20, wherein the at least one processor is operable to update the destination address of the address table located within at least one of the local memory of the at least one processor and the main memory to represent an address within the local memory to which the corresponding module is copied.

22. The apparatus of claim 20, wherein the at least one processor is operable to:
load the at least one software program module into the local memory by obtaining the source address of the module from the address table located within at least one of the local memory of the at least one processor and the main memory, copying the module into the local memory starting at an address dictated by a heap pointer, which represents a position within the local memory at which free space begins; and
update the destination address of the module by changing the destination address of the address table located within at least one of the local memory of the at least one processor and the main memory to include the heap pointer.

23. The apparatus of claim 22, wherein:
each entry of the address table located within at least one of the local memory of the at least one processor and the main memory further includes at least one of: (i) a size of the corresponding module; and (ii) a frame address representing an address at which static data of the corresponding module is located; and
the at least one processor is operable to augment the heap pointer by an amount corresponding to the size of the module loaded into the local memory.

24. The apparatus of claim 20, wherein the at least one processor is operable to:
execute a first software program module such that it calls a second software program module, each of the software program modules is formed of one or more sections of executable program code and includes a header having one or more entries, each entry having an entry address representing an address within the module at which a corresponding one of the sections of executable program code is located;

push a previous value of a frame pointer onto a stack of the local memory; and load a frame pointer with the destination address augmented with the frame address of the second module.

25. The apparatus of claim 24, wherein:

the step of calling includes loading the instruction pointer with the destination address augmented with the entry address of the particular section of program code of the second module;

the actions further include jumping to the address of the instruction pointer; and returning to the first module from the second module by popping the previous value of the frame pointer off of the stack and executing a next instruction.

26. The apparatus of claim 24, wherein:

the first module is located within the local memory of the first processor;

the second module is a located within the local memory of the second processor; and the first processor is operable to push data onto a stack of the local memory of the first processor and transfer at least some of the data to a stack of the local memory of the second processor.

27. The apparatus of claim 24, wherein each processor is operable to:

push a value of a frame pointer onto a stack of the local memory thereof;

load the frame pointer with the destination address augmented with the frame address of the second module;

load an instruction pointer with the destination address augmented with the entry address of the particular section of program code of the second module;

jump to the address of the instruction pointer; and return to the first module from the second module by popping the previous value of the frame pointer off of the stack of the local memory and executing a next instruction.

\* \* \* \* \*